Figure 1:
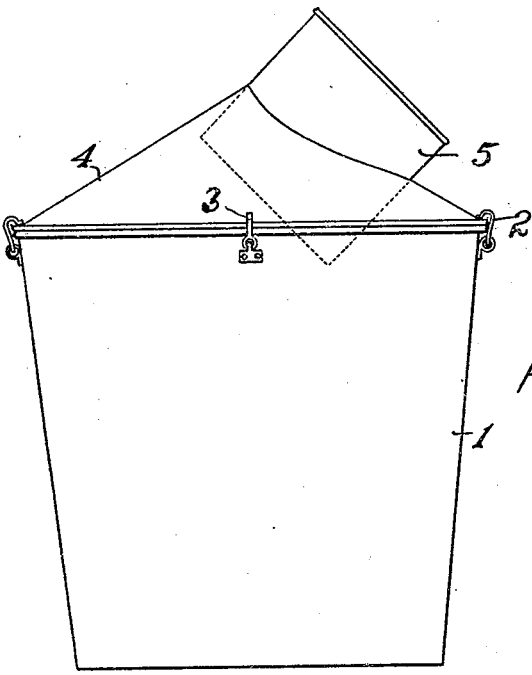

I. N. HORNE.
MILKING RECEPTACLE.
APPLICATION FILED OCT. 16, 1909.

958,399.

Patented May 17, 1910.
2 SHEETS—SHEET 1.

WITNESSES
R. B. Ulins.
R. W. Frost

INVENTOR
IRVING N. HORNE
BY Ellis Spear Jr.
ATTY.

I. N. HORNE.
MILKING RECEPTACLE.
APPLICATION FILED OCT. 16, 1909.
958,399.
Patented May 17, 1910.
2 SHEETS—SHEET 2.
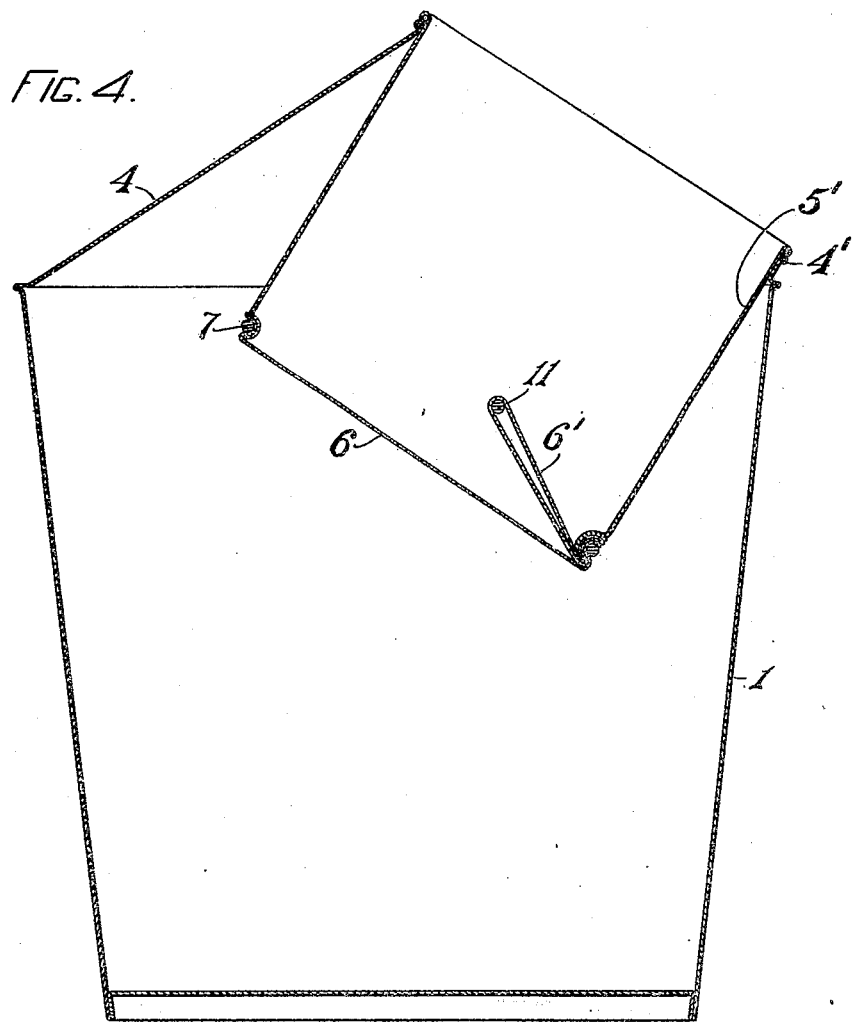
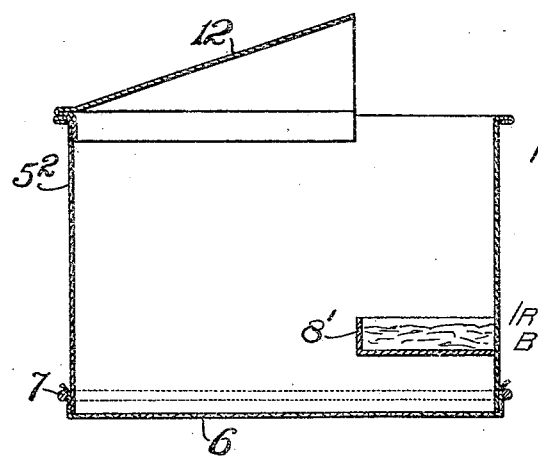
WITNESSES
R. B. Ellis.
R. W. Frost.
INVENTOR
IRVING N. HORNE
BY Ellis Spear Jr.
ATTY.

UNITED STATES PATENT OFFICE.

IRVING N. HORNE, OF PORTLAND, MAINE, ASSIGNOR, BY MESNE ASSIGNMENTS, TO STERILAC COMPANY, OF BOSTON, MASSACHUSETTS, A CORPORATION.

MILKING-RECEPTACLE.

958,399.  Specification of Letters Patent.  Patented May 17, 1910.

Application filed October 16, 1909. Serial No. 522,925.

*To all whom it may concern:*

Be it known that I, IRVING N. HORNE, a citizen of the United States, residing at Portland, county of Cumberland, State of Maine, have invented certain new and useful Improvements in Milking-Receptacles, of which the following is a specification.

This invention relates to milking receptacles or milk pails and particularly to the dirt excluding or removing features of the same.

As is well known, the dirt, hair or other filth, which is always present to some extent even in the most carefully attended stock, not only becomes entrained in the milk as it is extracted from the udder but also falls upon all exposed surfaces and thus enters the milk or comes into such contact with it as to cause contamination. It, therefore, makes but little difference whether dirt enters the milk or the milk comes in contact with the dirt in reaching the receptacle, the result is substantially the same. It thus happens that the milk strainer interposed in the pail while preventing filth from entering the container is a mere collector of dirt through which the milk must pass in order to reach the receptacle. It is, therefore, a matter of great importance, whether the milk be filtered during the milking or not, that its entry into the receptacle be guarded against the fall of foreign matter. Where a filter is employed it is also of great importance that the filter be protected from contamination and also that it be disposed so as to handle the milk with the least agitation possible as any spattering simply means an increased opportunity for contamination and an increased tendency to drain surrounding particles of dirt into the pail in the path of the milk which is to come.

The object of my invention is to provide a milking receptacle which will shield its own point of entry, guard its strainer and, furthermore, receive and handle the milk with the least danger of contamination.

To this end my invention provides for a disposition of parts which, while permitting the free entry of the milk, will guard that entry, and for a relative disposition of the strainer with regard to these parts so that the strainer will not only be protected but will be adapted to receive the milk in the best possible manner and also for a dirt guard which will catch any dirt dropping into the receiver vertically or carried in obliquely or dropping from the milk streams.

In the specification which follows my invention will be more fully described, and in connection with it I have shown drawings which show embodiments illustrative of the principles of my invention.

Figure 3:
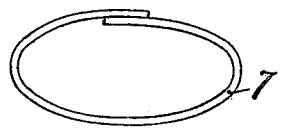
Figure 2:
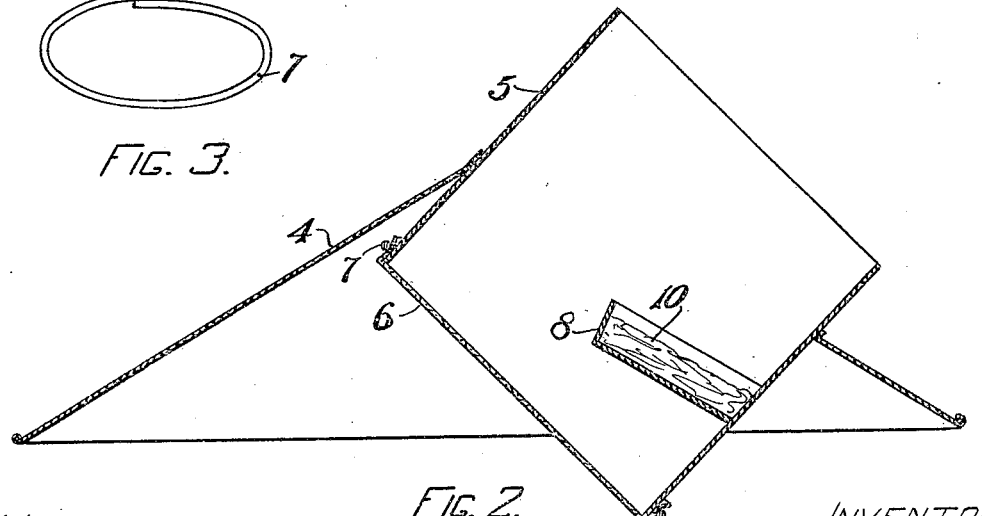

In these drawings:—Figure 1 is a general view of a milk pail fitted in accordance with my invention, Fig. 2 shows an enlarged sectional view of a pail cover with a receiver in accordance with my invention, Fig. 3 is a view of my filter cloth clamping ring, Fig. 4 is a view showing slight modifications in the construction of the receiver, and Fig. 5 is a further modification of the receiver shown in similar section.

1 is a pail having the usual lugs or ears 2 and bail 3.

4 is a cover having a receptacle 5 set at an incline therein. The receptacle 5 is preferably a cylindrical sleeve or chamber open at both ends to permit the passage of milk through it into the pail 1. The receptacle 5 is preferably set at an angle to the vertical axis of the pail 1 and is preferably of such a length that in its incline to the vertical axis of the pail its upper edge will substantially overhang the opening at the bottom of the chamber, thus protecting this opening from the vertical fall of dirt and protecting the screen or filter cloth 6 which is drawn over the bottom of the opening and clamped by the spring ring 7. The degree of the inclination of the receptacle 5 and its length may, of course, vary and the inclination upon which the pail 1 is held will differ slightly with different milkers, according to the practice of the locality. With some milkers the pail is set upon the floor, while others prefer to hold the pail between the knees during the milking. It is, therefore, desirable that the length of the receptacle 5 and its inclination be such as to afford fair and substantial overhang to the opening and the filter 6 as will substantially protect it against the vertical fall of all foreign matter. In order to further protect the opening and the filter cloth 6, I provide a raised guard or shelf disposed on the lower side of the receptacle 5 so as to substantially shield that portion which is unprotected by the overhang of the upper wall. This guard may be a shelf, as indicated at 8 in Fig. 2, or it may be any other suitable means.

The shelf 8 in Fig. 2 is filled with filtering material, such as absorbent cotton, indicated at 10. This catches any dirt or contaminated milk which falls upon it and enables it to be readily removed. Perforations might be provided in this shelf if desired to permit any milk which may fall or spatter upon it to quickly drain out, but it is preferable practice to permit no milk to enter the receptacle which has been in contact even for a short time with foreign matter. I, therefore, prefer to make the shelf tight to hold any milk which falls therein and prevent it from passing on into the receptacle. In Fig. 4 I have shown a preferred construction of this guard which consists merely of a cross bar 11 over which a strip $6^1$ of filter cloth may be drawn, the end of this cloth being clamped under the ring 7 which is used to hold the main filter cloth 6. This affords a lighter and more easily cleaned and sterilized construction. Whatever the construction of the shelf or guard it should be so disposed as to lie below the normal line of entry of the milking stream. This makes it a guard for any drip or drop from the stream or foreign matter borne in or by it. This is, of course, in addition to its function of catching any dropping matter from above the mouth of the milk receiver. In Fig. 4 I have also shown a preferred form of a receiving chamber and top construction. It will be noted that the top is provided with a rolled rim $4^1$ upon which the rim of the receptacle $5^1$ rests, thus removably supporting the receptacle $5^1$. The lower end of $5^1$ is preferably grooved to receive the ring 7 so as to allow for the clearance in removing it through the mouth of the neck. This clearance might, of course, be secured in other ways, as by a flange about the top or a slight taper in the cylinder $5^1$. In both of these constructions shown in Figs. 2 and 3 it will be noted that the filter cloth 6 is disposed at substantially right angles to the fall of the stream of milk. This reduces the spattering and such spattering as occurs takes place in the presence of clean surrounding walls from which it can secure no contamination and from which it can wash down on to the filter 6 no dirt. The cover 4 may be made removable or may be permanently fastened to the top of the pail, according to the preference of the user.

In Fig. 5 I have shown a modification which illustrates a further application of a milk receiving chamber partially guarded by a projecting shelf. In Fig. 5 I have indicated the chamber as $5^2$. 12 is a segmental cover positioned to overhang one side of the opening and $8^1$ is a shelf disposed on one side of the opposite wall and shielding that portion which is not overhung by the cover 12 and is thus exposed.

Various further modifications than those which I have suggested may be made in the construction and arrangement of parts and in their adaptation to the various vessels and usages of such modifications if within the limits of the appended claims are within the spirit of my invention.

That side of the milk receiver which lies below the normal line of entry of the milk stream and which is adjacent to the side wall of the pail and contains the guard or shelf is herein designated as the lower side of the receiver, and the opposite side which is provided with or forms the overhang and which is located above the line of entry of the milk stream is designated as the upper side of the receiver.

What I, therefore, claim and desire to secure by Letters Patent is:—

1. In a device of the class described, an open milk receiver having one side disposed to partly vertically overhang the opening and an imperforate shelf across the receiver and blocking the vertically exposed portion of said opening.

2. A cover for a milk retainer having an inclined milk receiving opening and having its upper side vertically overhanging its mouth and an imperforate shelf across said opening covering that portion of the mouth vertically uncovered by said overhang.

3. A milk pail having its cover provided with a milk receiver which is open at its upper and lower ends and carries a strainer at its lower end, said receiver having its upper side constructed with an overhang which extends outwardly over the strainer and protects the same, and said receiver having below said overhang and above said strainer an internal guard which extends from the lower side of the receiver inwardly and is separated from the upper side of the receiver by a passageway for the milk, substantially as set forth.

4. A milk pail having its cover provided with a milk receiver which is open at its upper and lower ends and carries a strainer at its lower end, said receiver being arranged obliquely in said cover and overhanging outwardly, and being provided with an internal guard which extends from the lower side of the receiver inwardly and is separated from the overhanging upper side of the receiver by a passageway for the milk, substantially as set forth.

5. A device of the class described comprising a closed receptacle, a tubular milk receiver angularly disposed therein and adapted to support a filter on its inner end, said filter end being substantially within the overhanging side of the outer end and a segmental dirt guard across the receiver and substantially blocking the exposed portion of said opening.

6. In a device of the class described, a closed containing vessel, a tubular milk receiving chamber open at both ends but adapted to support the filter on its inner end and supported in said vessel so as to have its outer end substantially overhang said filter end and means to support a guard across the receiving chamber at its lower inner surface outside of the line of said overhang.

7. In a device of the class described, a closed containing vessel, a tubular milk receiving chamber open at both ends, a clamping ring adapted to support a filter on the inner end of said chamber, said chamber being supported in said vessel so as to have its outer end substantially overhang the filter end, and a bar to support a guard strip across the receiving chamber at its lower inner surface outside of the line of said overhang, substantially as set forth.

8. A device of the class described, comprising a pail, a cover therefor, a tubular milk receiver open at both ends, disposed in said cover so as to have one side of its outer end disposed to partly vertically overhang the opening of its inner end and a bar across the receiver outside of the line of said overhang and a spring ring about said inner end.

9. In a device of the class described, a milk receiving chamber open at both ends for the passage of milk therethrough and means for supporting a dirt catching surface on one side of said receiving chamber between its ends and disposed below the normal line of entry of the milking stream.

In testimony whereof, I affix my signature in presence of two witnesses.

IRVING N. HORNE.

Witnesses:
IRA E. PIERCE,
ENOCH O. GREENLEAF.